United States Patent
Kang (10) Patent No.: US 9,895,645 B2
(45) Date of Patent: Feb. 20, 2018

(54) APPARATUS FOR TREATING SUBSTRATE

(71) Applicant: SAMSUNG DISPLAY CO., LTD., Yongin-si, Gyeonggi-do (KR)

(72) Inventor: Jin Goo Kang, Suwon-si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 15/014,051

(22) Filed: Feb. 3, 2016

(65) Prior Publication Data
US 2017/0080375 A1  Mar. 23, 2017

(30) Foreign Application Priority Data
Sep. 21, 2015 (KR) .................. 10-2015-0133062

(51) Int. Cl.
*B01D 53/04* (2006.01)
*B01D 53/26* (2006.01)
*B01D 53/86* (2006.01)

(52) U.S. Cl.
CPC ....... *B01D 53/0407* (2013.01); *B01D 53/261* (2013.01); *B01D 2253/108* (2013.01); *B01D 2253/116* (2013.01); *B01D 2253/1122* (2013.01); *B01D 2255/20761* (2013.01); *B01D 2257/104* (2013.01); *B01D 2258/0216* (2013.01); *B01D 2259/40098* (2013.01)

(58) Field of Classification Search
None
See application file for complete search history.

(56) References Cited

U.S. PATENT DOCUMENTS 6,159,421 A  *  12/2000  Fujii  .................. B01D 53/8668
                                                      134/1.3
2001/0026747 A1 * 10/2001 Saga  ................. H01L 21/67772
                                                      414/200

FOREIGN PATENT DOCUMENTS

| KR | 10-2004-0028871 A | 4/2004 |
| KR | 10-2007-0051651 A | 5/2007 |
| KR | 10-2010-0121975 A | 11/2010 |
| KR | 20-2015-0001953 U | 5/2015 |

* cited by examiner

Primary Examiner — Kishor Mayekar
(74) Attorney, Agent, or Firm — Lee & Morse, P.C.

(57) ABSTRACT

An apparatus for treating a substrate, including a chamber; a substrate treater in the chamber; a purifier connected to the chamber, the purifier to purify polluted air in the chamber; a light source in the chamber, the light source to irradiate light; and a light-shield to block the light irradiated by the light source from arriving at the substrate treater.

17 Claims, 10 Drawing Sheets

APPARATUS FOR TREATING SUBSTRATE

CROSS-REFERENCE TO RELATED APPLICATION

Korean Patent Application No. 10-2015-0133062, filed on Sep. 21, 2015, in the Korean Intellectual Property Office, and entitled: "Apparatus for Treating Substrate," is incorporated by reference herein in its entirety.

BACKGROUND

1. Field

Embodiments relate to an apparatus for treating a substrate.

2. Description of the Related Art

The importance of display devices has grown with developments in multimedia technology, and a variety of display devices such as, for example, liquid crystal displays (LCDs) and organic light-emitting diodes (OLEDs), have been developed and become widespread.

SUMMARY

Embodiments may be realized by providing an apparatus for treating a substrate, including a chamber; a substrate treater in the chamber; a purifier connected to the chamber, the purifier to purify polluted air in the chamber; a light source in the chamber, the light source to irradiate light; and a light-shield to block the light irradiated by the light source from arriving at the substrate treater.

The polluted air may contain moisture and oxygen, and the purifier may include a moisture absorption portion and an oxygen removal portion, the moisture absorption portion to remove the moisture from the polluted air and the oxygen removal portion to remove the oxygen from the polluted air.

The moisture absorption portion may include a first filter, the first filter including a moisture absorbent.

The moisture absorbent may be a molecular sieve.

The oxygen removal portion may include a second filter, the second filter including a copper catalyst.

The light source may irradiate ultraviolet light, infrared light, or microwaves.

The substrate treater may be a printing device including a plurality of nozzles.

The light-shield may be a film covering the plurality of nozzles.

The plurality of nozzles may include jet orifices, and the light-shield may cover entire surfaces of the plurality of nozzles except for the jet orifices.

The light-shield may be on a path of the light irradiated by the light source, the light-shield to block the light irradiated by the light source from being directly applied onto the substrate treater.

The apparatus may further include openings formed at one side of the chamber; and gloves extending from the openings, respectively, into the chamber.

The apparatus may further include a heater in the chamber, the heater to heat inner surfaces of the chamber.

The apparatus may further include an entrance to open or close an inner space of the chamber.

The apparatus may further include a transferrer to transfer a target object to be treated in response to the target object being introduced through the entrance.

The apparatus may further include a sub-chamber connected to the entrance.

The sub-chamber may include a sub-entrance and an atmosphere controller, the sub-entrance to open or close the sub-chamber and the atmosphere controller to adjust an atmosphere in the sub-chamber.

The atmosphere controller may include a vacuum forming portion and a gas injection portion, the vacuum forming portion to form a vacuum in the sub-chamber and the gas injection portion to inject a gas into the sub-chamber.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The term "on" that is used to designate that an element is on another element or located on a different layer or a layer includes both a case where an element is located directly on another element or a layer and a case where an element is located on another element via another layer or still another element. In the entire description, the same drawing reference numerals are used for the same elements across various figures. In the drawing figures, the dimensions of features may be exaggerated for clarity of illustration.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Hereinafter, embodiments will be described in detail with reference to the attached drawings.

Figure 1:
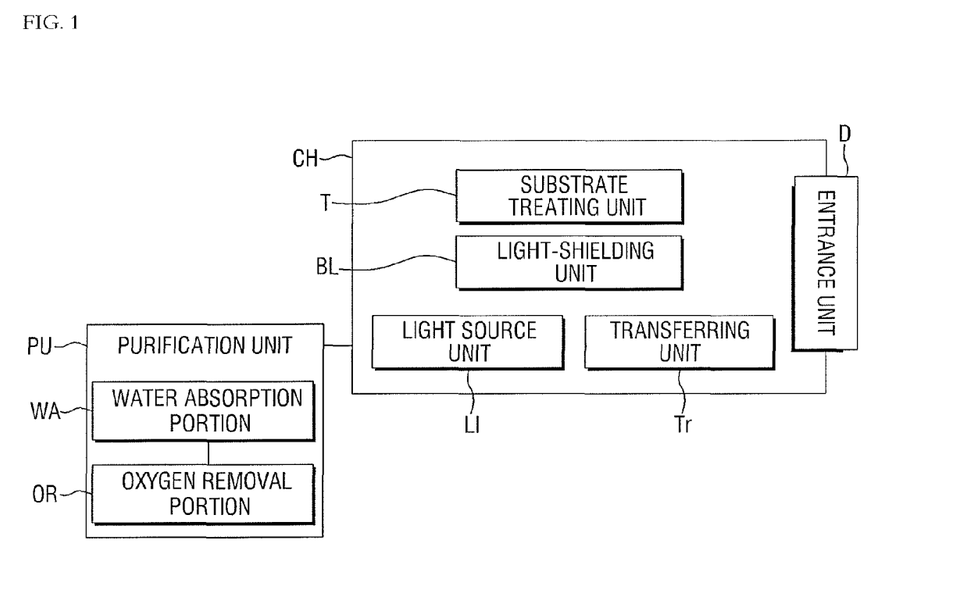
FIG. 1 illustrates a block diagram of an apparatus for treating a substrate according to an exemplary embodiment.

FIG. 1 illustrates a block diagram of an apparatus for treating a substrate according to an exemplary embodiment.

Referring to FIG. 1, the apparatus according to the present exemplary embodiment may include a sealable chamber CH, a substrate treating unit T, which may be disposed in the chamber CH, a purification unit PU, which may be connected to the chamber CH and purifies the air inside the chamber CH, a light or microwave source unit (herein, a light source unit LI), which may be disposed in the chamber CH and irradiates or emits light or microwaves, and a light or microwave shielding unit (herein a light-shielding unit BL), which may prevent light or microwaves emitted from the light source unit LI from arriving at the substrate treating unit T.

The chamber CH may have an inner space of a particular size. The chamber CH may provide a space for arranging various other elements therein. The inner space of the chamber CH may be blocked from the outer space of the chamber CH. For example, the inner space of the chamber CH may be a sealed space. The inner space and the outer space of the chamber CH may be separated from each other, and an exchange of the air therebetween may be blocked. In an embodiment, an entrance unit D may be provided at the chamber CH, and the chamber CH may be opened or closed by the entrance unit D. For example, in response to the entrance unit D being opened, the inner space and the outer space of the chamber CH may be connected to each other, and in response to the entrance unit D being closed, the inner space and the outer space of the chamber CH may be blocked from each other.

The inner space of the chamber CH may be, for example, cuboidal.

The substrate treating unit T may be disposed in the chamber CH. The substrate treating unit T may treat a substrate. The substrate treating unit T may be understood as a broad concept encompassing nearly all possible means for physicochemically processing the substrate. For example, the substrate treating unit T may include one or more of a printing device, a deposition device, or a baking device for forming a particular element on the substrate. In an embodiment, the substrate treating unit T may include means for performing a mechanical assembly process using the substrate or performing chemical treatment on the substrate.

In an embodiment, the substrate treating unit T may include a device for performing an encapsulation of an organic light-emitting display device.

The substrate treating unit T may include means for supporting or accommodating a target object to be treated, i.e., the substrate. For example, the substrate treating unit T may include a stage on which the substrate may be accommodated. There is no particular restriction on how the substrate treating unit T supports or accommodates the substrate to treat the substrate, and any type of supporting or accommodating method may be used.

The purification unit PU may be connected to the chamber CH and may purify the air inside the chamber CH.

In response to multiple processes being performed in the substrate treating unit T, the air inside the chamber CH may be polluted. The term "polluted air", as used herein, may mean that the air inside the chamber CH may contain moisture and/or oxygen. The purification unit PU may remove moisture and/or oxygen from polluted air in the chamber CH, i.e., the air containing moisture and/or oxygen. For example, a nitrogen ($N_2$) atmosphere may be formed in the chamber CH. In this example, polluted air in the chamber CH may include $N_2$ and moisture and/or oxygen.

In response to the air in the chamber CH being polluted by processes performed by the substrate treating unit T, i.e., in response to the content of moisture and/or oxygen in the chamber CH increasing, the moisture and/or oxygen may affect the substrate disposed in the chamber CH. The moisture and/or oxygen may degrade the properties of elements disposed on the substrate or may cause problems such as corrosion to the elements disposed on the substrate, which may lead to product defects. To address these problems, a purification process for purifying the air in the chamber CH may be necessary. The purification process may be performed during, or in a rest period between, processes for treating the substrate.

The purification unit PU may perform the aforementioned purification process. For example, the purification unit PU may be connected to the chamber CH, may receive polluted air from the chamber CH, may remove moisture and/or oxygen from the polluted air, and may provide purified air to the chamber CH. The purification unit PU may include a moisture absorption portion WA for removing moisture and an oxygen removal portion OR for removing oxygen. The absorption portion WA may contain a moisture absorbent. For example, the moisture absorbent may be a molecular sieve. In an embodiment, various compounds capable of absorbing moisture may be used as the moisture absorbent.

The oxygen removal portion OR may remove oxygen from the air. The oxygen removal portion OR may contain a catalyst. For example, the catalyst may be a copper (Cu) catalyst. In an embodiment, various metallic or nonmetallic materials may be used as a catalyst for absorbing oxygen.

The light source unit LI may be disposed in the chamber CH. The light source unit LI may irradiate light inside the chamber CH. Light irradiated by the light source unit LI may travel toward the inner surfaces of the chamber CH or the substrate treating unit T or may travel toward another element disposed in the chamber CH.

As described above, in response to the processes for treating the substrate being performed by the substrate treating unit T, the air inside the chamber CH may contain moisture and/or oxygen. Molecules of polluted air containing moisture and/or oxygen may be adsorbed onto the inner surfaces of the chamber CH and the surfaces of various elements disposed in the chamber CH. For example, even after the purification process for purifying the air inside the chamber CH is performed, some of the molecules of the polluted air in the chamber CH may still remain adsorbed onto the inner surfaces of the chamber CH and the surfaces of the elements in the chamber CH. Some of the remaining polluted air molecules may be desorbed in subsequent processes and may affect the substrate.

Light irradiated by the light source unit LI in the chamber CH may be applied to the polluted air molecules adsorbed onto the inner surfaces of the chamber CH or the surfaces of the elements in the chamber CH. Then, the internal energy of the polluted air molecules may increase, and the polluted air molecules may be desorbed from the surfaces where they are attached, and the desorbed air molecules may be purified by the purification unit PU. For example, light irradiated by the light source unit LI may vibrate, or increase the internal energy of, the polluted air molecules adsorbed onto the inner surfaces of the chamber CH or the surfaces of the elements in the chamber CH, the polluted air molecules may be desorbed, and the purification unit PU may be aided in purification of the air inside the chamber CH. The light source unit LI may improve the purification performance of the purification unit PU in two ways. First, the polluted air molecules may be desorbed from the inner surfaces of the chamber CH or the surfaces of the elements in the chamber CH, and may be purified by the purification unit PU. Second, polluted air molecules receiving light irradiated by the light source unit LI may have a higher energy than other polluted air molecules not receiving light irradiated by the light source unit LI, and may have an increased response speed in the purification unit PU. For example, polluted air molecules with high energy may have a higher response speed than polluted air molecules with low energy, and may be purified in the purification unit PU at a higher speed than polluted air molecules with low energy.

The light source unit LI may improve the purification performance of the purification unit PU quantitatively or qualitatively. The general purification speed of the purification unit PU may be improved, and takt time may be reduced and general operating efficiency may be improved.

Light irradiated by the light source unit LI may be microwaves, ultraviolet (UV) light, or infrared (IR) light.

The apparatus according to the present exemplary embodiment may also include the light-shielding unit BL. The light-shielding unit BL may block light irradiated by the light source unit LI from being directly applied to the substrate treating unit T. As described above, the substrate treating unit T may include a chemical material or a mechanic device that is susceptible to light. If light is directly applied to the substrate treating unit T, the performance and life-time of the substrate treating unit T may decrease, and the light-shielding unit BL may prevent this from happening. The light-shielding unit BL may be, for example, provided as a screen and may be disposed in the middle of a path of light, and may block light from being directly applied to the substrate treating unit T. In an embodiment, the light-shielding unit BL may be provided as a film covering the surface of the substrate treating unit T.

The apparatus according to the present exemplary embodiment may also include the entrance unit D, which may open or close the chamber CH. The entrance unit D may be disposed on at least one side of the chamber CH. The entrance unit D may open or close the chamber CH. In response to the entrance unit D being opened, the inner space of the chamber CH may be connected to the outer space of the chamber CH, and in response to the entrance unit D being closed, the inner space of the chamber CH may be blocked from the outer space of the chamber CH. The substrate, which may be the target object to be treated, may be put in and out of the chamber CH through the entrance unit D. If the inner space of the chamber CH is connected to the outside of the chamber CH, the amount of time it takes to form a particular atmosphere in the chamber CH may increase. For example, once the chamber CH is exposed to the external air, it takes time to form an atmosphere again in the chamber CH, and takt time may be lost. To address these problems, the entrance unit D may include a sub-entrance SD. The sub-entrance SD may prevent the external air from being introduced into the inner space of the chamber CH while the substrate is being put in and out of the chamber CH. The sub-entrance SD will be described later in detail.

The apparatus according to the present exemplary embodiment may also include a transferring unit Tr, which may transfer the target object to be treated, i.e., the substrate introduced into the chamber CH through the entrance unit D, to the substrate treating unit T. The transferring unit Tr may accommodate the target object to be treated, i.e., the substrate introduced into the chamber CH through the entrance unit D, on, for example, the stage of the substrate treating unit T. For example, the transferring unit Tr may include one or more of a robotic arm, a chuck, or a conveyor belt.

The apparatus according to the present exemplary embodiment will hereinafter be described in further detail.

Figure 2:
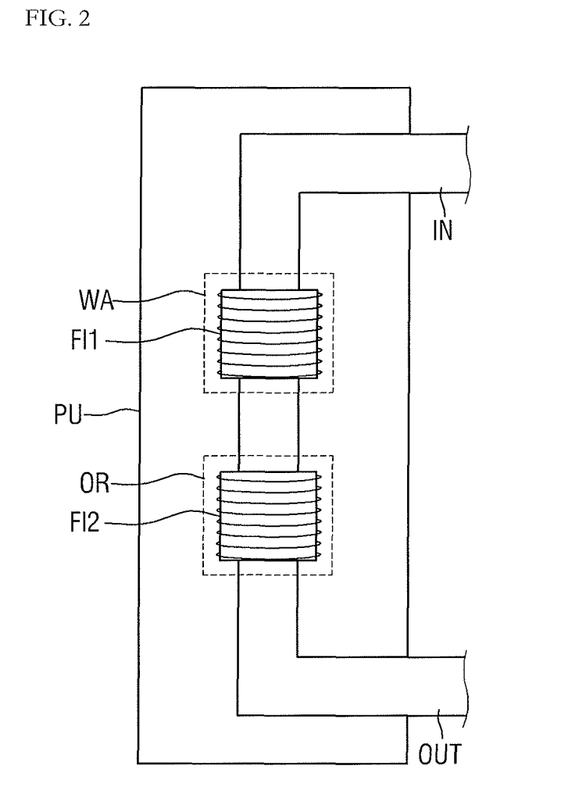
FIG. 2 illustrates a partial enlarged view of the apparatus of FIG. 1.

FIG. 2 illustrates a partial enlarged view of the apparatus of FIG. 1.

Referring to FIG. 2, the purification unit PU may include a first filter FI1 and a second filter FI2. As described above, the purification unit PU may include the moisture absorption portion WA for removing moisture from the air and the oxygen removal portion OR for removing oxygen from the air. The moisture absorption portion WA may include the first filter for removing moisture from the air. The first filter FI1 may contain a moisture absorbent. For example, the moisture absorbent of the first filter FI1 may be a molecular sieve. In an embodiment, various compounds capable of absorbing moisture may be used as the moisture absorbent of the first filter FI1.

The oxygen removal portion OR may include the second filter FI2 for removing oxygen from the air. The second filter FI2 may use a metallic or nonmetallic material as a catalyst. For example, the second filter FI2 may be a filter using Cu as a catalyst. In an embodiment, various metallic or nonmetallic materials capable of removing oxygen may be used as the catalyst of the second filter FI2.

The purification unit PU may include an inlet line IN and an outlet line OUT, which may be connected to the chamber CH. Polluted air in the chamber CH may be introduced into the purification unit PU through the inlet line IN. Then, the polluted air may be purified, passing through the first filter FI1 and the second filter FI2. The purified air, i.e., air with moisture and oxygen removed therefrom, may be introduced back into the chamber CH through the outlet line OUT.

The first filter FI1 and the second filter FI2 are illustrated in FIG. 2 as being arranged in series inside a single pipeline. In an embodiment, the first filter FI1 and the second filter FI2 may be arranged in parallel in different pipelines.

In an embodiment, more than one first filter FI1 and more than one second filter FI2 may be provided.

Figure 3:
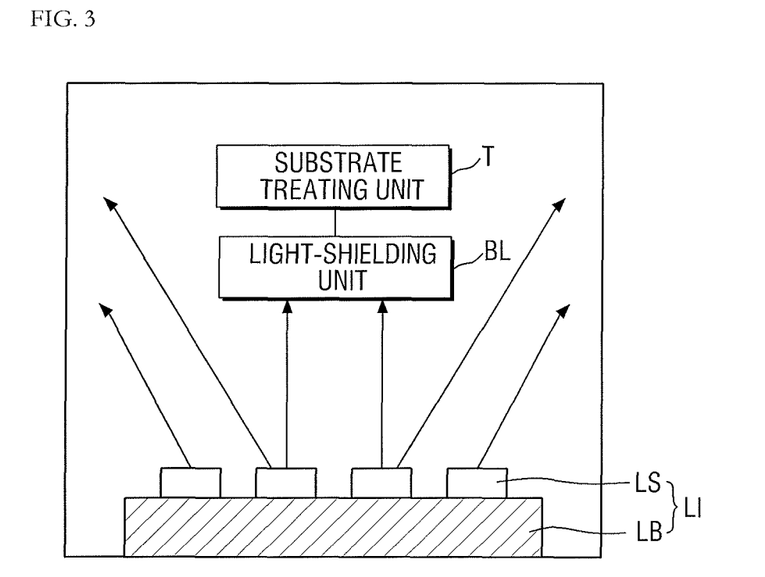
FIG. 3 illustrates a partial block diagram of the apparatus of FIG. 1.

FIG. 3 illustrates a partial block diagram of the apparatus of FIG. 1.

Referring to FIG. 3, the light source unit LI may include a base substrate LB and a light-emitting portion LS, which may be mounted on the base substrate LB.

As described above, the light source unit LI may be disposed on at least one side of the inside of the chamber CH. The light source unit LI may include the base substrate LB and the light-emitting portion LS, which may be mounted on the base substrate LB. The base substrate LB may include a printed circuit board (PCB) and may provide space in which to mount the light-emitting portion LS. The base substrate LB may also supply power to the light-emitting portion LS. For example, the base substrate LB may supply power necessary for the light-emitting portion LS to irradiate light, and may electrically control the light-emitting portion LS.

The light-emitting portion LS may be disposed on the base substrate LS. For example, the light-emitting portion LS may include at least one UV lamp. The UV lamp may irradiate UV light onto the inner surfaces of the chamber CH and the surfaces of the elements in the chamber CH.

In an embodiment, the light source unit LI may irradiate one or more of microwaves, UV light, or IR light.

Figure 4:
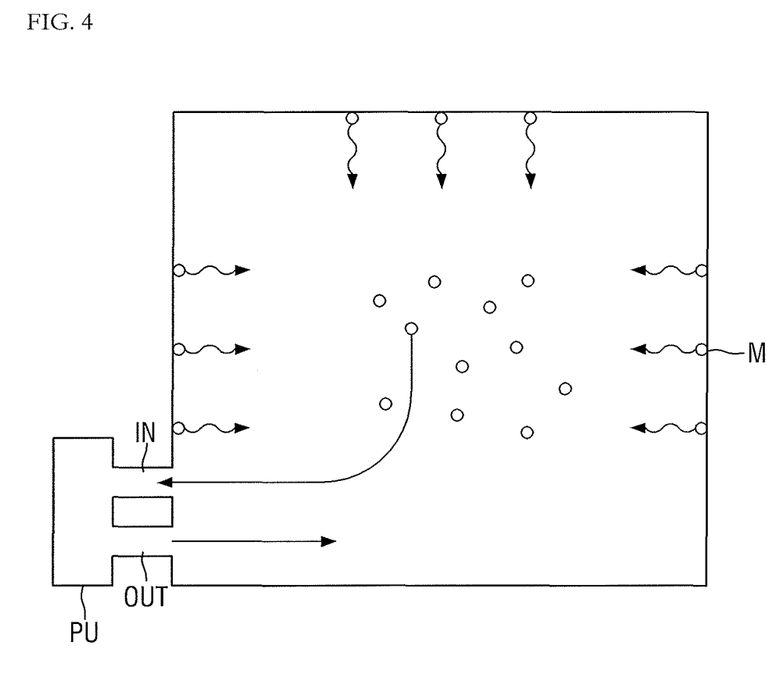
FIG. 4 illustrates a schematic view of an operation of the apparatus of FIG. 1.

FIG. 4 illustrates a schematic view of an operation of the apparatus of FIG. 1.

As described above, once a particular process is performed by the substrate treating portion T, polluted air may be formed inside the chamber CH. Since polluted air containing moisture and oxygen may affect the target object to be treated, i.e., the substrate, it may be necessary to remove the polluted air from the chamber CH before performing a subsequent process.

Molecules M of polluted air may be adsorbed onto the inner surfaces of the chamber CH or the surfaces of the elements in the chamber CH. Some of the polluted air molecules M may not be purified by the purification unit PU and may remain attached on the inside of the chamber CH, and the target object to be treated, i.e., the substrate, may be adversely affected in subsequent processes.

In response to light irradiated by the light source unit LI being applied to the polluted air molecules M, the internal energy of the polluted air molecules M may increase, and the polluted air molecules M may be desorbed from the surfaces where they are attached. The desorbed polluted air molecules M may float inside the chamber CH and may be introduced into the inlet line IN of the purification PU, and may be purified. For example, light irradiated by the light source unit LI may vibrate, or increase the internal energy of, the polluted air molecules M, the polluted air molecules M may be desorbed from the surfaces where they are attached, and the purification unit PU may be aided in purification of the air inside the chamber CH.

The light source unit LI may improve the purification performance of the purification unit PU in two ways. First, the light source unit LI may allow the polluted air molecules M to be desorbed from the inner surfaces of the chamber CH or the surfaces of the elements in the chamber CH, and may be purified by the purification unit PU. Second, polluted air molecules M receiving light irradiated by the light source unit LI may have a higher energy than other polluted air molecules M not receiving light irradiated by the light source unit LI, and may have an increased response speed in the purification unit PU. For example, polluted air molecules M with high energy have a higher response speed than polluted air molecules M with low energy, and may be purified in the purification unit PU at a higher speed than polluted air molecules with low energy.

The light source unit LI may improve the purification performance of the purification unit PU quantitatively or qualitatively. The general purification speed of the purification unit PU may be improved, and takt may be reduced and general operating efficiency may be improved.

An apparatus for treating a substrate according to an exemplary embodiment will hereinafter be described. In FIGS. 1 to 5, like reference numerals denote like elements, and detailed descriptions thereof will be omitted.

Figure 5:
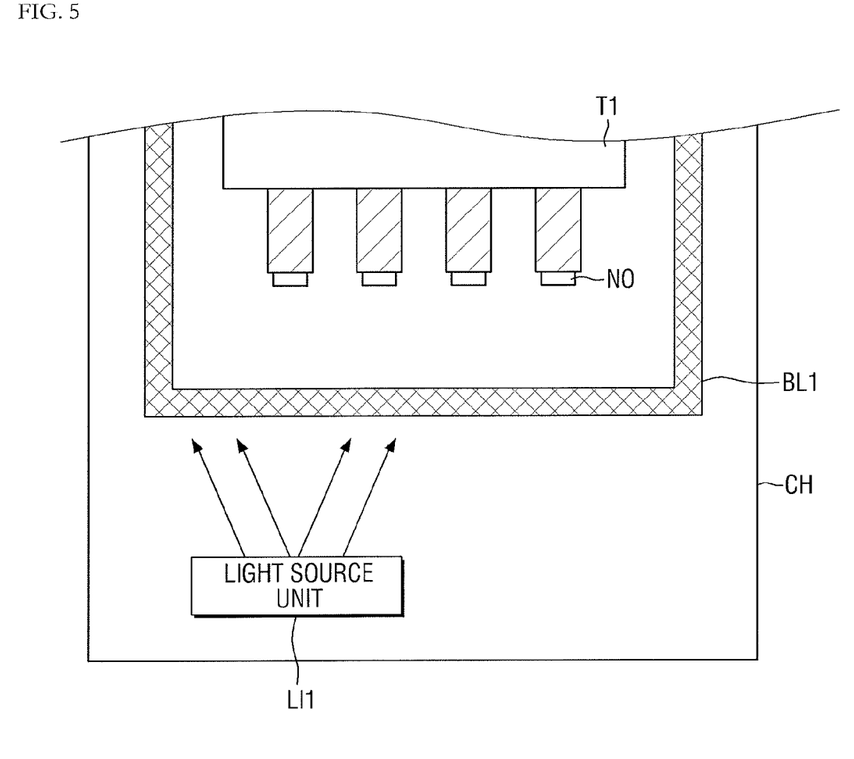
FIG. 5 illustrates a partial block diagram of an apparatus for treating a substrate according to an exemplary embodiment.

FIG. 5 illustrates a partial block diagram of an apparatus for treating a substrate according to an exemplary embodiment.

Referring to FIG. 5, the apparatus according to the present exemplary embodiment differs from the apparatus of FIG. 1 in that a substrate treating unit T1 thereof is a printing device including a plurality of nozzles NO.

The substrate treating unit T1 may be a printing device for forming a particular layer on a substrate, which may be a target object to be treated. For example, the substrate treating unit T1 may be a nozzle printing device and may include the plurality of nozzles NO.

For example, an ink for particular use may be disposed or remain in each of the plurality of nozzles NO of the substrate treating unit T1 before or after each process. The ink, for example, an ink for use in forming an emission layer in an organic light-emitting diode (OLED) display, may be degraded upon exposure to, for example, UV light. To address this problem, the apparatus according to the present exemplary embodiment, like the apparatus of FIG. 1, may include a light-shielding unit BL1, as described above.

For example, the light-shielding unit BL1 may be provided as a screen. For example, the light-shielding unit BL1 may be disposed in the middle of a path of light irradiated by the light source unit LI, and may prevent the light from being directly applied onto the substrate treating unit T1. The light-shielding unit BL1 may be, for example, formed of a black material completely absorbing light. In an embodiment, the light-shielding unit BL1 may be formed of a metal material reflecting light.

Figure 6:
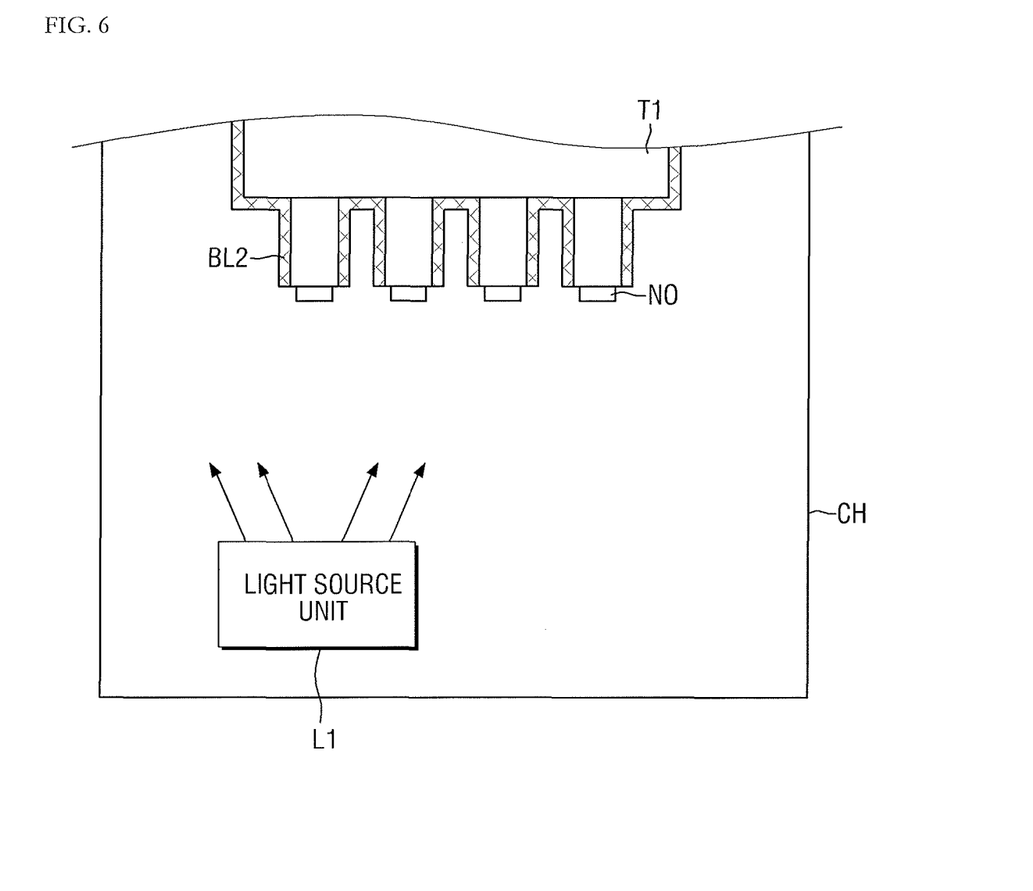
FIG. 6 illustrates a partial block diagram of a modified example of the apparatus of FIG. 5.

FIG. 6 illustrates a partial block diagram of a modified example of the apparatus of FIG. 5.

Referring to FIG. 6, an apparatus for treating a substrate according to a modified example of the exemplary embodiment of FIG. 5 differs from the apparatus of FIG. 5 in that a light-shielding unit BL2 thereof is formed along the surface of a substrate treating unit T1.

The light-shielding unit BL2 may be provided as a layer covering the substrate treating unit T1. For example, the light-shielding unit BL2 may be a light-shielding layer covering the substrate treating unit T1. The light-shielding layer may cover the entire surface of the substrate treating unit T1 and may block light from being directly applied onto the substrate treating unit T1. The light-shielding unit BL2 may be formed of a black material completely absorbing light or a metal material reflecting light, as mentioned above with regard to the light-shielding unit BL1.

In response to the substrate treating unit T1 being a printing device with a plurality of nozzles NO, the light-shielding unit BL2 may be formed to cover the entire surfaces of the plurality of nozzles NO except for the jet orifices through which an ink is ejected. It may be possible to readily treat a substrate without a requirement of additional subsequent processes while preventing an ink disposed in each of the plurality of nozzles NO from being exposed to light irradiated by the light source unit LI.

Figure 7:
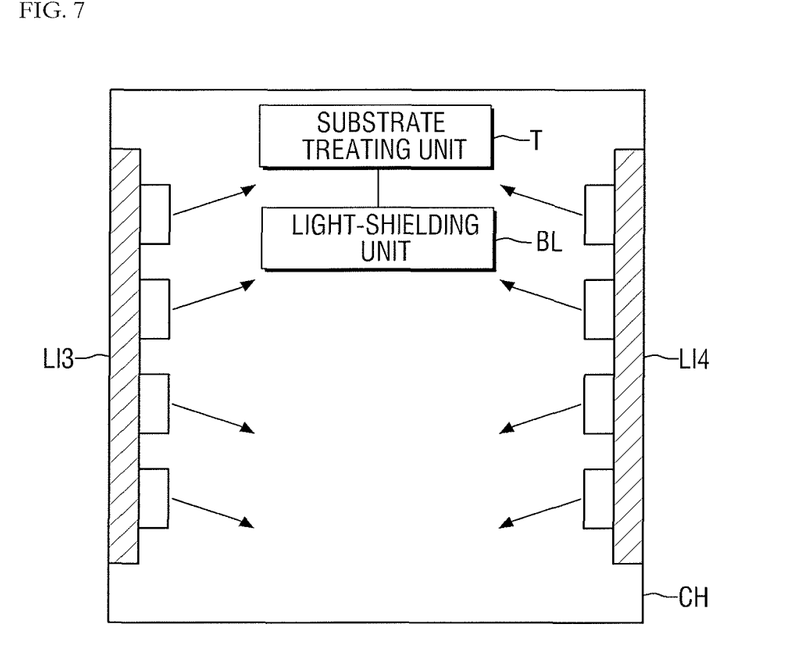
FIG. 7 illustrates a partial block diagram of an apparatus for treating a substrate according to an exemplary embodiment.

FIG. 7 illustrates a partial block diagram of an apparatus for treating a substrate according to an exemplary embodiment.

Referring to FIG. 7, the apparatus according to the present exemplary embodiment differs from the apparatus of FIG. 1 in that it includes two light source units LI3 and LI4.

For example, the apparatus according to the present exemplary embodiment may include a plurality of light source units. The plurality of light source units may include a first light source unit LI3, which may be disposed at one side of the inside of a chamber CH, and a second light source unit LI4, which may be disposed at another side of the inside of the chamber CH to face the first light source unit LI3. The first light source unit LI3 and the second light source unit LI4 may be substantially identical to the light source unit LI of the exemplary embodiment of FIG. 1, 5, or 6, and detailed descriptions thereof will be omitted.

In response to the plurality of light source units being provided in the chamber CH, light may be irradiated to every inch of the inside of the chamber CH, and the purification efficiency of an apparatus for treating a substrate may be improved.

Figure 8:
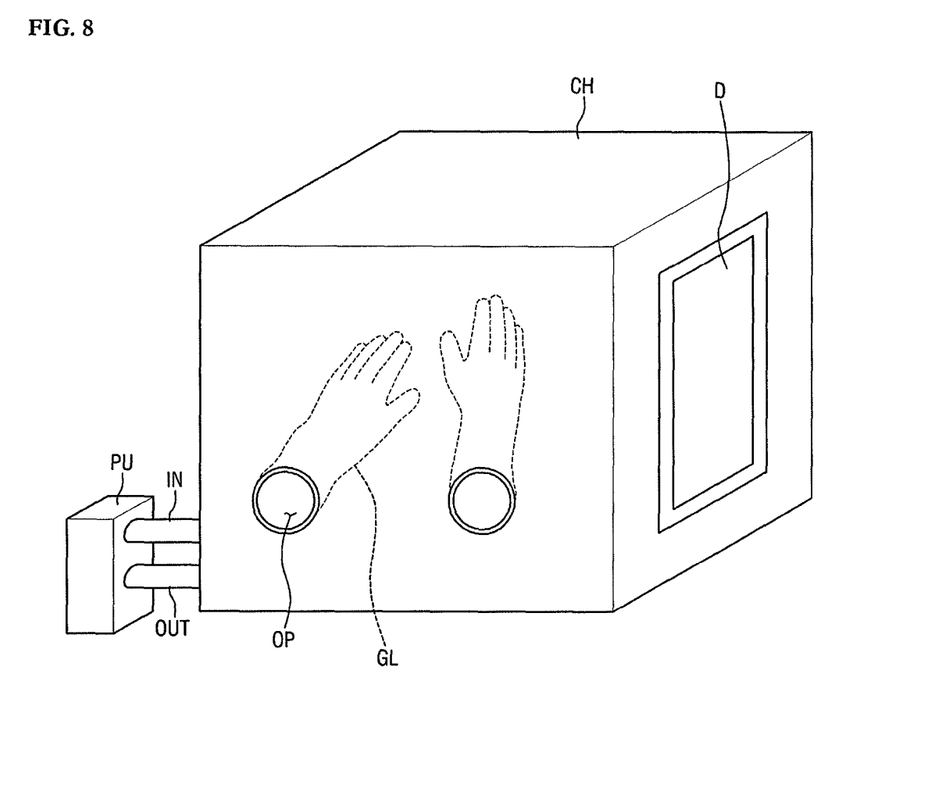
FIG. 8 illustrates a perspective view of an apparatus for treating a substrate according to an exemplary embodiment.

FIG. 8 illustrates a perspective view of an apparatus for treating a substrate according to an exemplary embodiment.

Referring to FIG. 8, the apparatus according to the present exemplary embodiment differs from the apparatus of FIG. 1 in that it further includes gloves GL that may be worn by a user and help the user perform manual work while maintaining the atmosphere inside a chamber CH.

Two openings, which respectively correspond to the hands of the user, may be formed on one side of the chamber CH. The gloves GL may be formed to extend from the openings, respectively, to the inside of the chamber CH. For convenience, first ends of the gloves GL may be formed to conform to the shape of human hands.

Second ends of the gloves GL may be connected to the openings. To maintain the atmosphere in the chamber CH, the second ends of the gloves GL and the openings may be completely sealed. The gloves GL may be formed of, for example, a rubber material or a flexible plastic material. In response to the gloves GL being formed of a flexible material, the user may be able to put his or her hands in the chamber CH and perform sophisticated work in the chamber CH.

Figure 9:
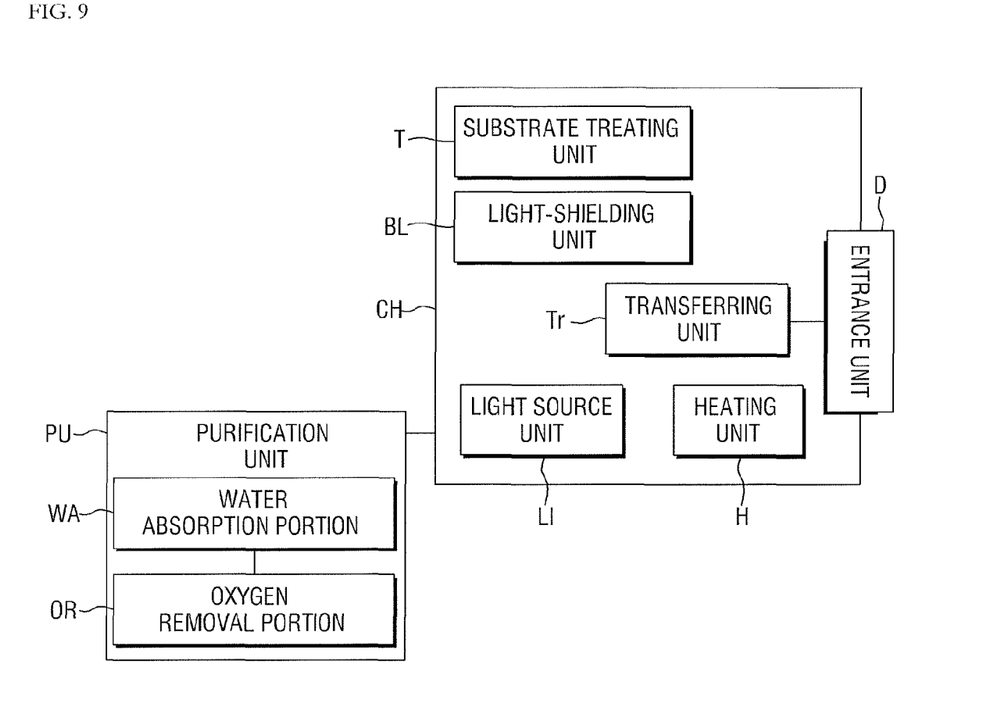
FIG. 9 illustrates a block diagram of an apparatus for treating a substrate according to an exemplary embodiment.

FIG. 9 illustrates a block diagram of an apparatus for treating a substrate according to an exemplary embodiment.

Referring to FIG. 9, the apparatus according to the present exemplary embodiment differs from the apparatus of FIG. 1 in that it further includes a heating unit H, which may be disposed in a chamber CH.

The heating unit H, which may be disposed in the chamber CH, may raise the temperature inside the chamber CH, and the internal energy of polluted air molecules in the chamber CH may be improved. For example, the heating unit H may increase the energy of polluted air molecules in the chamber CH along with a light source unit LI.

In an embodiment, the heating unit H may be connected to the inner surfaces of the chamber CH and may adjust the temperature on the inner surfaces of the chamber CH, rather than the temperature in the chamber CH. The heating unit H may increase the temperature on the inner surfaces of the chamber CH, and may improve the energy of polluted air molecules M adsorbed onto the inner surfaces of the chamber CH.

In response to the heating unit H being additionally provided along with the light source unit LI, the kinetic energy of polluted air molecules in the chamber CH may be improved, and the purification efficiency of an apparatus for treating a substrate may be improved.

Figure 10:
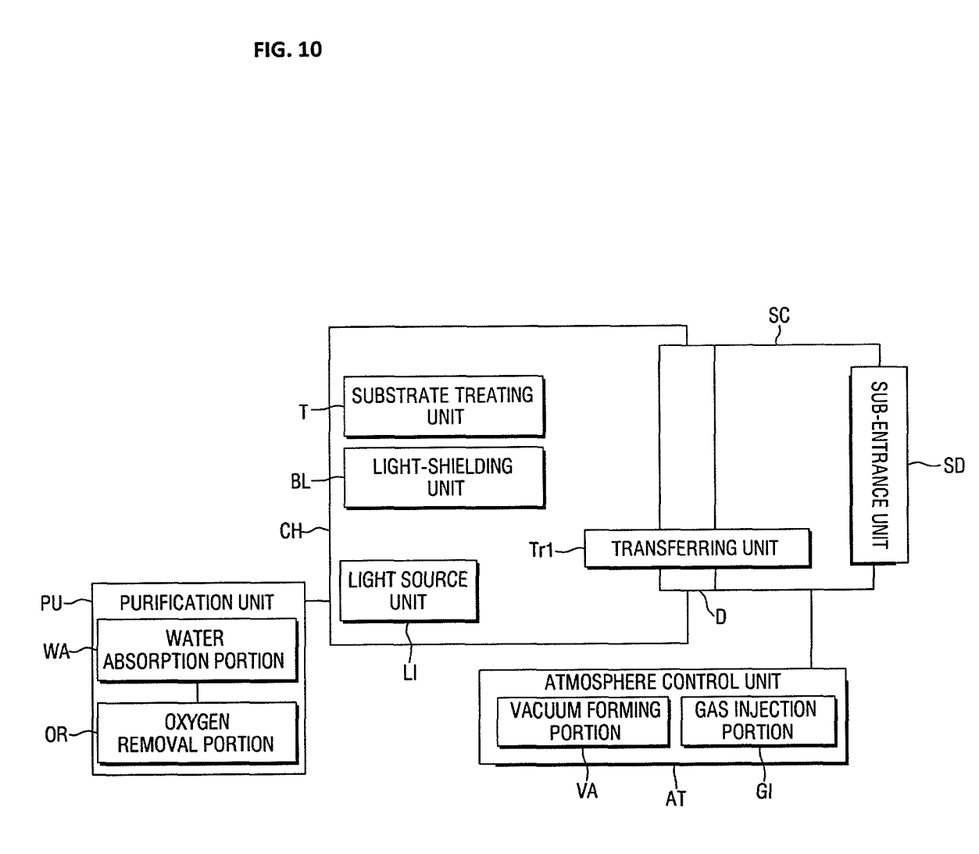
FIG. 10 illustrates a block diagram of an apparatus for treating a substrate according to an exemplary embodiment.

FIG. 10 illustrates a block diagram of an apparatus for treating a substrate according to an exemplary embodiment.

Referring to FIG. 10, the apparatus according to the present exemplary embodiment differs from the apparatus of FIG. 1 in that it further includes a sub-chamber SC, which may be connected to an entrance unit D.

As described above, a target object to be treated, such as a substrate, may be put in and out of a chamber CH through the entrance unit D. In response to the entrance unit D being opened, the inside of the chamber CH may be connected to the outside of the chamber CH, and it may be difficult to maintain the atmosphere in the chamber CH. For example, a particular atmosphere may be needed to perform a process in the chamber CH. The particular atmosphere may be interfered with in response to the entrance unit D being opened to introduce the external air into the chamber CH.

In the exemplary embodiment of FIG. 10, the sub-chamber SC may be connected to the entrance unit D, and the target object to be treated may be introduced into the chamber CH while maintaining the atmosphere in the chamber CH.

For example, the sub-chamber SC may include a sub-entrance unit SD, which may open or close the sub-chamber SC, and an atmosphere control unit AT, which may adjust the atmosphere in the sub-chamber SC.

The sub-chamber SC may have an inner space of a particular size. One side of the inner space of the sub-chamber SC may be connected to the entrance unit D, and the other side of the inner space of the sub-chamber SC may be connected to the sub-entrance unit SD. The inner space of the sub-chamber SC may cover the entrance unit D of the chamber CH and may be sealed, and may prevent the air from entering therebetween. Even if the entrance unit D of the chamber CH is opened, the chamber CH may not be connected to the external air as long as the sub-entrance unit SD of the sub-chamber SC is closed.

For example, in response to the entrance unit D of the chamber CH being open and the sub-entrance unit SD of the sub-chamber SC being closed, the inner space of the chamber CH may be connected only to the inner space of the sub-chamber SC.

The sub-chamber SC may include the atmosphere control unit AT. The atmosphere control unit AT may control the atmosphere in the sub-chamber SC. The atmosphere control unit AT may include a vacuum forming portion VA and a gas injection portion GI.

It will hereinafter be described how the atmosphere control unit AT may control the atmosphere in the sub-chamber SC.

A target object to be treated, such as a substrate, may be introduced into the sub-chamber SC through the sub-entrance unit SD, during which, the entrance unit D of the chamber CH may remain closed.

In response to the target object to be treated being introduced, the sub-entrance unit SD may be closed. Once the sub-entrance unit SD is closed, the inner space of the sub-chamber SC may be sealed.

Thereafter, the vacuum forming portion VA may suck the air out of the sub-chamber SC, and may form a vacuum in the sub-chamber SC. Once a vacuum is formed in the sub-chamber SC, the gas injection portion GI may inject a gas necessary for performing a process in the chamber CH into the sub-chamber SC. For example, the gas may be a $N_2$ gas. In an embodiment, the atmosphere control unit AT may control the atmosphere in the sub-chamber SC to be substantially similar to the atmosphere in the chamber CH.

A vacuum forming process of the vacuum forming portion VA and a gas injection process of the gas injection unit GI may be sequentially or simultaneously performed at least once.

Once a desired atmosphere is established in the sub-chamber SC, the entrance unit D of the chamber CH may be opened. Then, a transferring unit Tr1 may transfer the target object to be treated, such as a substrate, from the sub-chamber SC into the chamber CH.

By providing the sub-chamber SC, it may be possible to prevent the external air from being introduced into the chamber CH while the target object to be treated, such as a substrate, is being put in and out of the chamber CH. For example, no additional process may be needed to adjust an atmosphere to perform a process in the chamber CH, and the general tact time may be reduced.

By way of summation and review, a display device may be fabricated by using a substrate as a base and performing several processes on the substrate. For example, these processes may include a thin film deposition process, a mask forming process, an etching process, and a rinsing process.

Each of the processes for fabricating a display device may require an optimal operational environment to be properly performed. For example, to efficiently achieve the goal of each of the processes for fabricating a display device, various operational factors such as, for example, temperature, a gas atmosphere and a vacuum condition, must be met. Some of the processes for fabricating a display device may be performed in a hermetically sealed chamber, in which case, a stage may need to be provided in the middle of a process or in a rest period between two consecutive processes to establish a particular environment. For example, it may be necessary to provide a stage in which various pollutants generated from a previous process may be removed and then a rinsing process or an atmosphere forming process may be performed to provide an optimal environment for a subsequent process. However, the atmosphere forming process may inhibit the continuity of the fabrication of a display device, and may require extra time, and the efficiency of the fabrication of a display device may be lowered. Embodiments may reduce the amount of time that it takes to perform the atmosphere forming process.

Exemplary embodiments may provide an apparatus for treating a substrate, which may be capable of effectively removing polluted air molecules from the inside of a chamber. Exemplary embodiments may also provide an apparatus for treating a substrate, which may be capable of quickly purifying the inside of a chamber and establishing a required environment for a subsequent process.

According to the exemplary embodiments, it may be possible to effectively remove polluted air molecules from the inside of a chamber. In addition, it may be possible to quickly purify the inside of a chamber and establish a required environment for a subsequent process.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An apparatus for treating a substrate, comprising:
a sealable chamber;
a substrate treater in the chamber;
a purifier connected to the chamber, the purifier to purify polluted air in the chamber;
a light or microwave source in the chamber, the light or microwave source to irradiate light or microwaves inside the chamber; and
a light or microwave-shield to block the light or microwaves irradiated by the light or microwave source from arriving at the substrate treater,
wherein the substrate treater is a printing device including a plurality of nozzles.

2. The apparatus as claimed in claim 1, wherein:
the polluted air contains moisture and oxygen, and
the purifier includes a moisture absorption portion and an oxygen removal portion, the moisture absorption portion to remove the moisture from the polluted air and the oxygen removal portion to remove the oxygen from the polluted air.

3. The apparatus as claimed in claim 2, wherein the moisture absorption portion includes a first filter, the first filter including a moisture absorbent.

4. The apparatus as claimed in claim 3, wherein the moisture absorbent is a molecular sieve.

5. The apparatus as claimed in claim 2, wherein the oxygen removal portion includes a second filter, the second filter including a copper catalyst.

6. The apparatus as claimed in claim 1, wherein the light or microwave source emits ultraviolet light, infrared light, or microwaves.

7. The apparatus as claimed in claim 1, wherein the light or microwave-shield is a film covering the plurality of nozzles.

8. The apparatus as claimed in claim 7, wherein:
the plurality of nozzles include jet orifices, and
the light or microwave-shield covers entire surfaces of the plurality of nozzles except for the jet orifices.

9. The apparatus as claimed in claim 1, wherein the light or microwave-shield is on a path of the light or microwaves irradiated by the light or microwave source, the light or microwave-shield to block the light or microwaves irradiated by the light or microwave source from being directly applied onto the substrate treater.

10. The apparatus as claimed in claim 1, further comprising:
openings formed at one side of the chamber; and
gloves extending from the openings, respectively, into the chamber.

11. The apparatus as claimed in claim 1, further comprising a heater in the chamber, the heater to heat inner surfaces of the chamber.

12. The apparatus as claimed in claim 1, further comprising an entrance to open or close an inner space of the chamber.

13. The apparatus as claimed in claim 12, further comprising a transferrer to transfer a target object to be treated in response to the target object being introduced through the entrance.

14. The apparatus as claimed in claim 12, further comprising a sub-chamber connected to the entrance.

15. The apparatus as claimed in claim 14, wherein the sub-chamber includes a sub-entrance and an atmosphere controller, the sub-entrance to open or close the sub-chamber and the atmosphere controller to adjust an atmosphere in the sub-chamber.

16. The apparatus as claimed in claim 15, wherein the atmosphere controller includes a vacuum forming portion and a gas injection portion, the vacuum forming portion to form a vacuum in the sub-chamber and the gas injection portion to inject a gas into the sub-chamber.

17. The apparatus as claimed in claim 1, wherein the light or microwave source emits infrared light or microwaves.

* * * * *